United States Patent
Koshinz et al.

(10) Patent No.: US 10,895,696 B2
(45) Date of Patent: Jan. 19, 2021

(54) EPOXY-FREE PLASTIC OPTICAL FIBER SPLICE DESIGN AND FABRICATION PROCESS

(71) Applicant: The Boeing Company, Chicago, IL (US)

(72) Inventors: Dennis G. Koshinz, Bellevue, WA (US); Eric Y. Chan, Mercer Island, WA (US); Tuong K. Truong, Bellevue, WA (US); Kim Quan Anh Nguyen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/664,751

(22) Filed: Oct. 25, 2019

(65) Prior Publication Data
US 2020/0057203 A1 Feb. 20, 2020

Related U.S. Application Data

(62) Division of application No. 16/046,719, filed on Jul. 26, 2018, now Pat. No. 10,495,821.

(51) Int. Cl.
*G02B 6/38* (2006.01)
*G02B 6/245* (2006.01)
*G02B 6/25* (2006.01)

(52) U.S. Cl.
CPC ........... *G02B 6/3803* (2013.01); *G02B 6/245* (2013.01); *G02B 6/25* (2013.01); *G02B 6/3802* (2013.01)

(58) Field of Classification Search
CPC ........ G02B 6/3803; G02B 6/245; G02B 6/25; G02B 6/3802; G02B 6/3806;
(Continued)

(56) References Cited

U.S. PATENT DOCUMENTS 4,148,554 A * 4/1979 Magnusson ............ G02B 6/262
385/66
4,575,136 A * 3/1986 Keller ..................... B60K 15/05
220/316

(Continued)

FOREIGN PATENT DOCUMENTS

EP 0766110 A1 4/1997

OTHER PUBLICATIONS

Extended European Search Report dated Dec. 12, 2019 in European Patent Application No. 19187409.8 (European counterpart of the instant U.S. patent application).

*Primary Examiner* — Ryan A Lepisto
*Assistant Examiner* — Erin D Chiem
(74) *Attorney, Agent, or Firm* — Ostrager Chong Flaherty & Broitman P.C.

(57) ABSTRACT

An epoxy-free, high-durability and low-cost plastic optical fiber splice design and fabrication process which meets commercial airplane environmental requirements. The splice design: (1) does not require the use of epoxy to join the end faces of two plastic optical fibers together; (2) incorporates double-crimp rings to provide highly durable pull force for the plastic optical fibers that are joined together; (3) resolves any vibration problem at the plastic optical fiber end faces using a miniature stop inside a splice alignment sleeve; and (4) incorporates a splice alignment sleeve that can be mass produced using precision molding or three-dimensional printing processes.

21 Claims, 11 Drawing Sheets

(58) Field of Classification Search
CPC .. G02B 6/3857; G02B 6/02033; G02B 6/443;
G02B 6/255; G02B 6/2555
See application file for complete search history.

(56) References Cited

U.S. PATENT DOCUMENTS

| | | | | |
|---|---|---|---|---|
| 5,097,522 | A * | 3/1992 | Tackett | G02B 6/2552 |
| | | | | 385/53 |
| 5,469,522 | A | 11/1995 | Fan | |
| 5,633,969 | A * | 5/1997 | Jennings | G02B 6/3825 |
| | | | | 385/60 |
| 5,923,805 | A * | 7/1999 | Anderson | G02B 6/3825 |
| | | | | 385/139 |
| 6,142,677 | A * | 11/2000 | Sato | C08L 61/06 |
| | | | | 385/72 |
| 6,350,065 | B1 * | 2/2002 | Arima | G02B 6/3806 |
| | | | | 385/70 |
| 6,636,672 | B1 * | 10/2003 | Blyler, Jr. | G02B 6/25 |
| | | | | 385/147 |
| 6,960,029 | B2 * | 11/2005 | Iijima | G02B 6/25 |
| | | | | 385/85 |
| 9,614,319 | B2 * | 4/2017 | Blunt | H01R 13/60 |
| 2005/0238292 | A1 * | 10/2005 | Barnes | G02B 6/3846 |
| | | | | 385/78 |
| 2008/0310798 | A1 * | 12/2008 | Cody | G02B 6/3887 |
| | | | | 385/80 |
| 2009/0103870 | A1 | 4/2009 | Solomon et al. | |
| 2014/0126859 | A1 | 5/2014 | Fabian et al. | |

\* cited by examiner

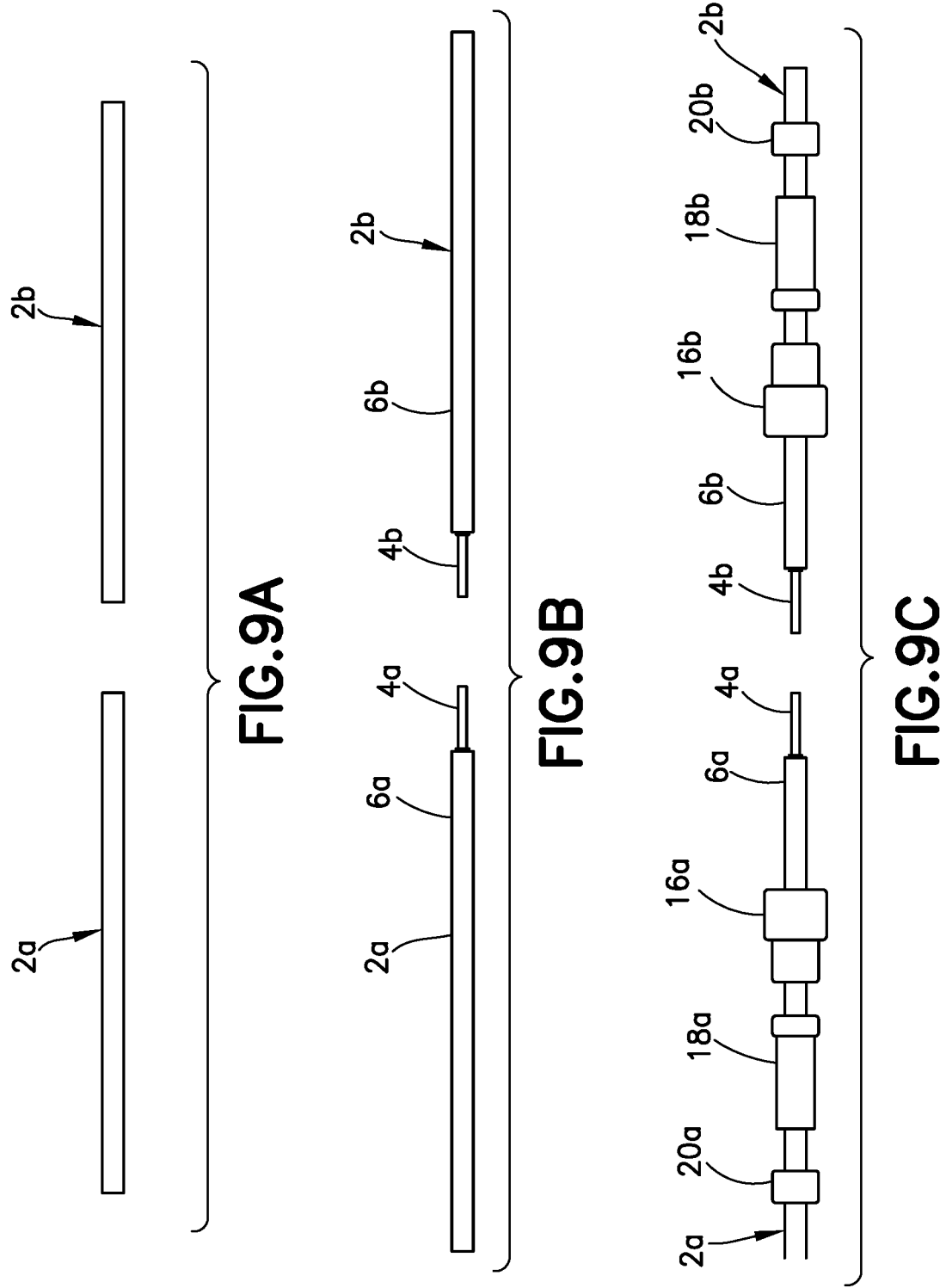

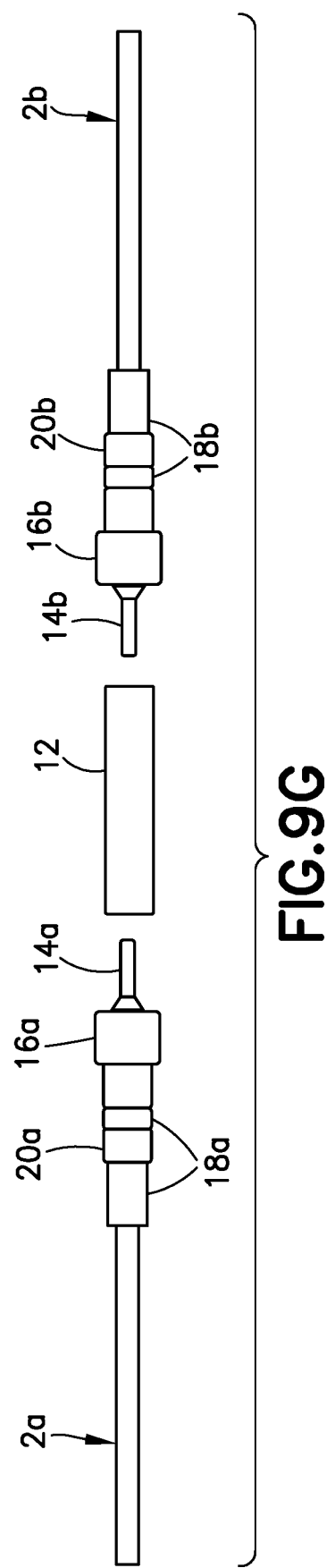
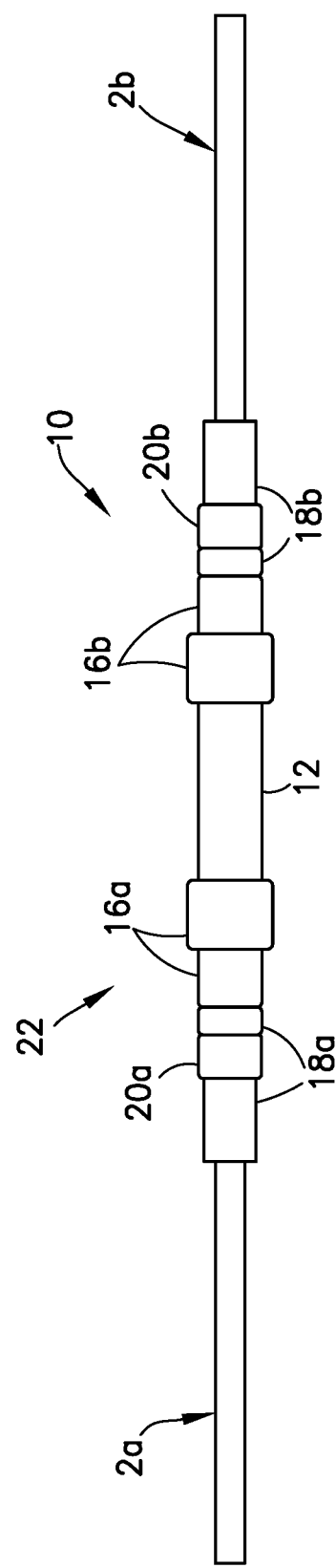

EPOXY-FREE PLASTIC OPTICAL FIBER SPLICE DESIGN AND FABRICATION PROCESS

RELATED PATENT APPLICATION

This application is a divisional of and claims priority from U.S. patent application Ser. No. 16/046,719 filed on Jul. 26, 2018, which issued at U.S. Pat. No. 10,495,821 B1 on Dec. 3, 2019.

BACKGROUND

The technology disclosed herein generally relates to methods for splicing two optical fibers together and, more particularly, relates to splicing two plastic optical fibers. As used herein, the term "splicing" means optically coupling the end faces of two optical fibers so that light emitted by one fiber is received by the other fiber.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber.

An important aspect of a fiber optic communication is that of connecting two fiber optic cables such that optical loss is minimized. Temporary or semi-permanent connections are made by means of specialized optical fiber connectors. It is often necessary to align an optical fiber with another optical fiber. This can involve either carefully aligning the fiber and placing it in contact with the device, or using a lens to allow optical coupling. In some cases the end of the fiber is polished into a curved form that makes it act as a lens.

A plastic optical fiber (POF) is an optical fiber that is made of polymeric materials. Similar to glass optical fiber, POF transmits light (for illumination or data) through the core of the fiber. Its chief advantage over the glass product, other aspects being equal, is its robustness under bending and stretching. Typically, the core is made of poly(methyl methacrylate) (PMMA) or polystyrene, while the cladding is made of fluorinated polymer.

Plastic optical fiber can be substituted for heavy and bulky copper conductors in an airplane data bus network. However, it is not uncommon for a plastic optical fiber to break during the complex airplane wiring process. A splice provides a quick repair of broken plastic optical fibers in the airplane wiring process.

Currently there is no commercial-off-the-shelf avionics-grade POF splice that is designed for a rugged avionics environment. Commercially available POF splice techniques use epoxy to join the two POF end faces. Joining the two end faces with epoxy is not very durable because bulk epoxy will soften at high temperature, thereby increasing the optical loss of the POF in the splice. The pull strength of the splice will be reduced at high temperature using the existing commercial POF splicing technique. The commercial POF splice does not address the issue of end-face damage due to a high-vibration environment. In addition, the use of epoxy requires ultraviolet light or heat for curing. This is not a preferred process to use during the wiring installation in a commercial airplane.

The well-established glass optical fiber fusion splicing technique using high-temperature arcing at the fiber end faces is not applicable to POF because of the material and fiber diameter differences. POF will melt instantly when arcing heat is applied at the POF end faces.

SUMMARY

The technology disclosed in some detail below solves the problem of splicing plastic optical fibers by adopting an epoxy-free, high-durability and low-cost POF splice design and fabrication process which meets commercial airplane environmental requirements. More specifically, the POF splice design disclosed below is capable of withstanding high vibrations (e.g., 10 G), high pull force (over 16 lbs.) and extreme temperature cycling (from −40 to +100 degree C.). The proposed splice design: (1) does not require the use of epoxy to join the end faces of two plastic optical fibers together; (2) incorporates double-crimp rings to provide highly durable pull force for the plastic optical fibers that are joined together; (3) resolves any vibration problem at the POF end faces using a miniature stop inside a splice alignment sleeve; and (4) incorporates a splice alignment sleeve that can be mass produced using precision molding or three-dimensional printing processes.

Because no epoxy is used, the splice fabrication process disclosed herein is quick and easy. The plastic optical fibers are optically coupled inside a splice alignment sleeve by crimping metal crimp rings at the two ends of the splice alignment sleeve. The POF splice disclosed herein has double crimp rings to hold the POF end faces at a maximum-optical-coupling position, which reduces the insertion loss of the POF splice. The mechanical force of the crimp ring holds the plastic optical fiber at this optimum position under the extreme temperature and vibration conditions to which the POF splice is subjected. The POF splice disclosed herein also incorporates a miniature stop at the two POF end-face interface to eliminate POF end-face damage (e.g., nicks and scratches) due to the high-vibration environment.

Although various embodiments of apparatus and methods for splicing plastic optical fibers will be described in some detail below, one or more of those embodiments may be characterized by one or more of the following aspects.

One aspect of the subject matter disclosed in detail below is an apparatus for guiding propagating light waves, comprising: a first plastic optical fiber cable comprising a first plastic optical fiber and a first jacket surrounding the first plastic optical fiber except for an end section of the first plastic optical fiber terminating at a first end face; a second plastic optical fiber cable comprising a second plastic optical fiber and a second jacket surrounding the second plastic optical fiber except for an end section of the second plastic optical fiber terminating at a second end face; and a plastic optical fiber splice assembly configured to optical couple the first and second end faces to each other, the plastic optical fiber splice assembly comprising: a first terminus having a first longitudinal section surrounding the end section of the first plastic optical fiber and a second longitudinal section surrounding a portion of the first jacket, the first terminus being made of thermoplastic material; a second terminus having a first longitudinal section surrounding the end section of the second plastic optical fiber and a second longitudinal section surrounding a portion of the second jacket, the second terminus being made of thermoplastic material; a splice alignment sleeve that surrounds the first longitudinal sections of the first and second termini and portions of the second longitudinal sections of the first and second termini, the splice alignment sleeve being made of thermoplastic material; a first crimp ring having a first longitudinal section surrounding and crimped onto one portion of the second longitudinal section of the first terminus and a second longitudinal section surrounding and crimped onto one end section of the splice alignment sleeve, the first crimp ring being made of metallic material; and a second crimp ring having a first longitudinal section surrounding and crimped onto one portion of the second longitudinal section of the second terminus and a second longitudinal section surrounding and crimped onto another end section of the splice alignment sleeve, the second crimp ring being made of metallic material. Preferably the first and second end faces do not contact each other. To prevent end-face contact, the splice alignment sleeve may comprise an aperture stop that maintains a gap between the first and second end faces. The interior space of the splice alignment sleeve is free of epoxy.

In accordance with one embodiment of the apparatus described in the preceding paragraph, the apparatus further comprises: a first boot having a longitudinal section that surrounds both another portion of the second longitudinal section of the first terminus and a portion of the first jacket of the first plastic optical fiber cable; a second boot having a longitudinal section that surrounds both another portion of the second longitudinal section of the second terminus and a portion of the second jacket of the second plastic optical fiber cable; a third crimp ring surrounding and crimped onto the longitudinal section of the first boot, the third crimp ring being made of metallic material; and a fourth crimp ring surrounding and crimped onto the longitudinal section of the second boot, the fourth crimp ring being made of metallic material. The first terminus is compressed onto the first jacket of the first plastic optical fiber cable by the first and third crimp rings in respective crimped states and the second terminus is compressed onto the second jacket of the second plastic optical fiber cable by the second and fourth crimp rings in respective crimped states.

Another aspect of the subject matter disclosed in detail below is a method for splicing first and second plastic optical fibers together, the method comprising: (a) stripping a portion of a first jacket of a first plastic optical fiber cable from an end section of a first plastic optical fiber of the first plastic optical fiber cable; (b) stripping a portion of a second jacket of a second plastic optical fiber cable from an end section of a second plastic optical fiber of the second plastic optical fiber cable; (c) sliding a first terminus made of thermoplastic material onto the first plastic optical fiber cable to a position whereat a first longitudinal section of the first terminus surrounds the end section of the first plastic optical fiber and a second longitudinal section of the first terminus surrounds a portion of the first jacket; (d) sliding a second terminus made of thermoplastic material onto the second plastic optical fiber cable to a position whereat a first longitudinal section of the second terminus surrounds the end section of the second plastic optical fiber and a second longitudinal section of the second terminus surrounds a portion of the second jacket; (e) sliding a first crimp ring made of metallic material onto the first terminus to a position whereat a first longitudinal section of the first crimp ring surrounds a first portion of the second longitudinal section of the first terminus; (f) sliding a second crimp ring made of metallic material onto the second terminus to a position whereat a first longitudinal section of the second crimp ring surrounds a first portion of the second longitudinal section of the second terminus; (g) crimping the first longitudinal section of the first crimp ring onto the second longitudinal section of the first terminus; (h) crimping the first longitudinal section of the second crimp ring onto the second longitudinal section of the second terminus; (i) after step (g), inserting the first longitudinal section of the first terminus into an opening at one end of a splice alignment sleeve until a second longitudinal section of the first crimp ring surrounds one end section of the splice alignment sleeve; (j) after step (h), inserting the first longitudinal section of the second terminus into an opening at another end of the splice alignment sleeve until a second longitudinal section of the second crimp ring surrounds another end section of the splice alignment sleeve; (k) after step (i), crimping the second longitudinal section of the first crimp ring onto the one end section of the splice alignment sleeve; and (l) after step (j), crimping the second longitudinal section of the second crimp ring onto the another end section of the splice alignment sleeve. Upon completion of steps (k) and (l), the first and second end faces of the POF do not contact each other inside the splice alignment sleeve, and an interior space of the splice alignment sleeve is free of epoxy.

In accordance with one embodiment of the splicing method described in the preceding paragraph, the method further comprises: sliding a first rubber boot onto the first terminus to a position whereat a longitudinal section of the first rubber boot surrounds a second portion of the second longitudinal section of the first terminus; sliding a third crimp ring made of metallic material onto the first rubber boot to a position whereat the third crimp ring surrounds a portion of the longitudinal section of the first rubber boot that surrounds the second portion of the second longitudinal section of the first terminus; and crimping the third crimp ring onto the first rubber boot, wherein the first and second portions of the second longitudinal section of the first terminus are compressed onto the first jacket of the first plastic optical fiber cable by the first and third crimp rings in respective crimped states. The same method may further comprise: sliding a second rubber boot onto the second terminus to a position whereat a longitudinal section of the second rubber boot surrounds a second portion of the second longitudinal section of the second terminus; sliding a fourth crimp ring made of metallic material onto the second rubber boot to a position whereat the fourth crimp ring surrounds a portion of the longitudinal section of the second rubber boot that surrounds the second portion of the second longitudinal section of the second terminus; and crimping the fourth crimp ring onto the second rubber boot, wherein the first and second portions of the second longitudinal section of the second terminus are compressed onto the second jacket of the second plastic optical fiber cable by the second and fourth crimp rings in respective crimped states.

A further aspect of the subject matter disclosed in detail below is an apparatus for guiding propagating light waves, comprising: a plastic optical fiber cable comprising a plastic optical fiber and a jacket surrounding the plastic optical fiber except for an end section of the plastic optical fiber terminating at an end face; a terminus having a first longitudinal section surrounding the end section of the plastic optical fiber and a second longitudinal section surrounding a portion of the jacket, the terminus being made of thermoplastic material; and a first crimp ring having a longitudinal section surrounding and crimped onto one portion of the second longitudinal section of the terminus, the first crimp ring being made of metallic material.

In accordance with one embodiment of the apparatus described in the preceding paragraph, the apparatus further comprises: a boot having a longitudinal section that surrounds both another portion of the second longitudinal section of the terminus and a portion of the jacket of the plastic optical fiber cable; and a second crimp ring surrounding and crimped onto the first longitudinal section of the boot, the second crimp ring being made of metallic material, wherein the first and second portions of the second longitudinal section of the terminus are compressed onto the jacket of the plastic optical fiber cable by the first and second crimp rings in respective crimped states.

Yet another aspect of the subject matter disclosed in detail below is a method for repairing a damaged plastic optical fiber cable onboard an airplane, the method comprising: (a) severing first and second undamaged sections of the damaged plastic optical fiber cable from a damaged section of the damaged plastic optical fiber cable by cutting the plastic optical fiber cable at first and second positions on opposite sides of the damaged section of plastic optical fiber cable to form the first and second plastic optical fiber cables; (b) stripping a portion of a first jacket of the first plastic optical fiber cable from an end section of a first plastic optical fiber of the first plastic optical fiber cable; (c) stripping a portion of a second jacket of the second plastic optical fiber cable from an end section of a second plastic optical fiber of the second plastic optical fiber cable; (d) sliding a first terminus made of thermoplastic material onto the first plastic optical fiber cable to a position whereat a first longitudinal section of the first terminus surrounds the end section of the first plastic optical fiber and a second longitudinal section of the first terminus surrounds a portion of the first jacket; (e) sliding a second terminus made of thermoplastic material onto the second plastic optical fiber cable to a position whereat a first longitudinal section of the second terminus surrounds the end section of the second plastic optical fiber and a second longitudinal section of the second terminus surrounds a portion of the second jacket; (f) sliding a first crimp ring made of metallic material onto the first terminus to a position whereat a first longitudinal section of the first crimp ring surrounds a first portion of the second longitudinal section of the first terminus; (g) sliding a second crimp ring made of metallic material onto the second terminus to a position whereat a first longitudinal section of the second crimp ring surrounds a first portion of the second longitudinal section of the second terminus; (h) crimping the first longitudinal section of the first crimp ring onto the second longitudinal section of the first terminus; (i) crimping the first longitudinal section of the second crimp ring onto the second longitudinal section of the second terminus; (j) polishing an end face of the first plastic optical fiber; (k) polishing an end face of the second plastic optical fiber; (l) after step (j), inserting the first longitudinal section of the first terminus into an opening at one end of a splice alignment sleeve until a second longitudinal section of the first crimp ring surrounds one end section of the splice alignment sleeve; (m) after step (k), inserting the first longitudinal section of the second terminus into an opening at another end of the splice alignment sleeve until a second longitudinal section of the second crimp ring surrounds another end section of the splice alignment sleeve; (n) after step (l), crimping the second longitudinal section of the first crimp ring onto the one end section of the splice alignment sleeve; and (o) after step (m), crimping the second longitudinal section of the second crimp ring onto the other end section of the splice alignment sleeve.

Other aspects of apparatus and methods for splicing plastic optical fibers are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 9A-9H are diagrams representing respective side views of the components of the POF splice assembly at various stages in the splicing process in accordance with one embodiment.

Reference will hereinafter be made to the drawings in which similar elements in different drawings bear the same reference numerals.

DETAILED DESCRIPTION

Illustrative embodiments of fiber optic devices are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
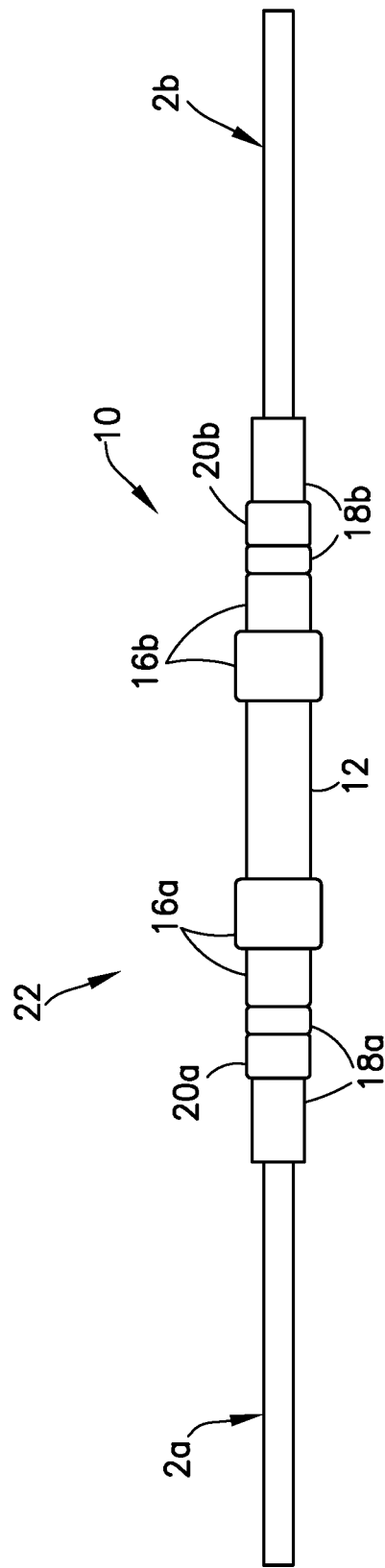
FIG. 1 is a diagram representing a side view of a fully assembled epoxy-free POF splice assembly in accordance with one embodiment.

FIG. 1 is a diagram representing a side view of a fully assembled epoxy-free plastic optical fiber splice assembly 10 (hereinafter "POF splice assembly 10") in accordance with one embodiment. The POF splice assembly 10 may be used to optically couple one end of one plastic optical fiber cable 2a (hereinafter "POF cable 2a") to one end of another plastic optical fiber cable 2b (hereinafter "POF cable 2b").

Figure 2:
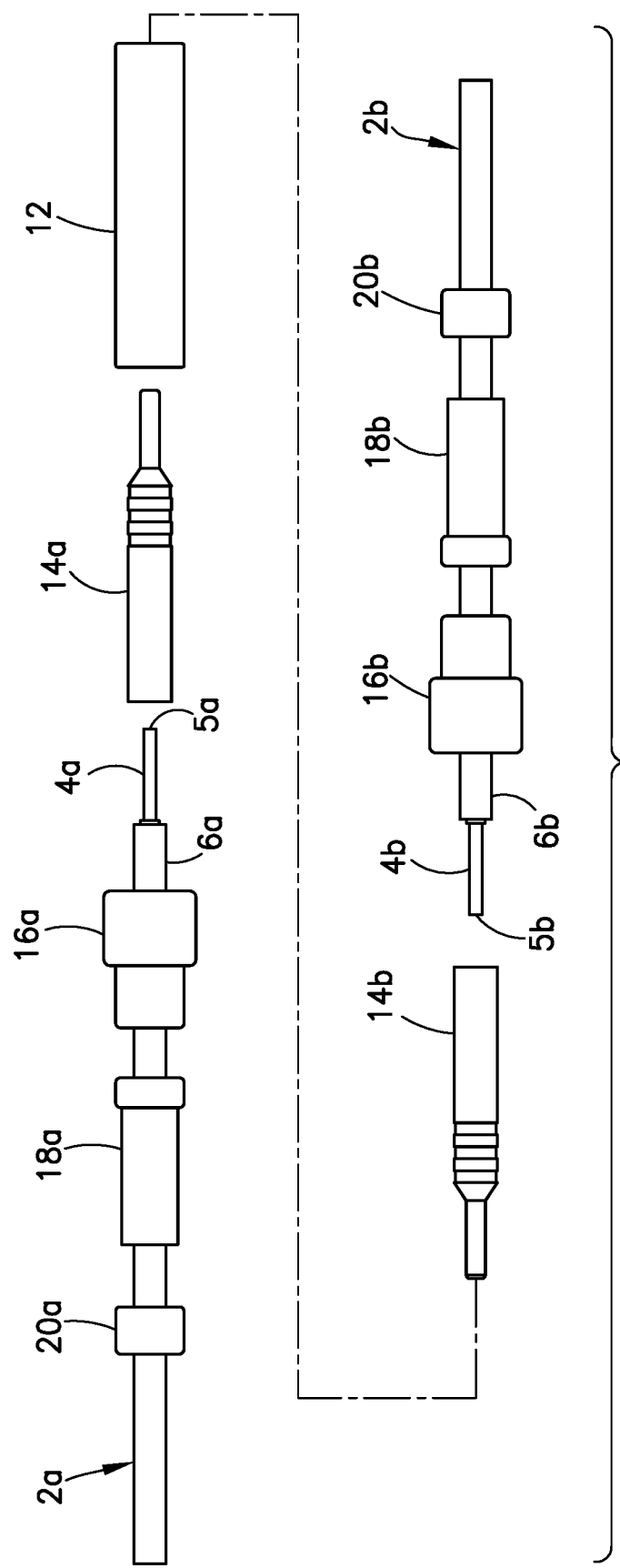
FIG. 2 is a diagram representing a partially exploded view of the components of the epoxy-free POF splice assembly depicted in FIG. 1.

FIG. 2 is a diagram representing a partially exploded view of the components of the POF splice assembly 10 depicted in FIG. 1. The POF cable 2a consists of a plastic optical fiber 4a having an end face 5a and a jacket 6a made of electrically insulating and flame-resistant thermoplastic material. The plastic optical fiber 4a is surrounded by the jacket 6a except in an end section (visible in FIG. 2) where the jacket 4a has been stripped away. Similarly, the POF cable 2b consists of a plastic optical fiber 6b having an end face 5b and a jacket 6b made of electrically insulating and flame-resistant thermoplastic material. The plastic optical fiber 4b is surrounded by the jacket 6b except in an end section (visible in FIG. 2) where the jacket 6b has been stripped away.

As best seen in FIG. 2, POF splice assembly 10 includes the following components: a splice alignment sleeve 12 made of thermoplastic material; a pair of termini 14a and 14b made of thermoplastic material; a pair of crimp rings 16a and 16b made of metallic material; a pair of rubber boots 18a and 18b; and a pair of crimp rings 20a and 20b made of metallic material. During assembly, the crimp ring 20a, rubber boot 18a and crimp ring 16a are slid onto the POF cable 2a in sequence. Also the crimp ring 20b, rubber boot 18b and crimp ring 16b are slid onto the POF cable 2b in sequence. This is the state of assembly depicted in FIG. 2. As will be explained in more detail below, after the crimp ring 16a has been slid onto the POF cable 2a, the terminus 14a is slid onto the POF cable 2a and then the crimp ring 16a is slid onto the terminus 14a. Similarly, after the crimp ring 16b has been slid onto the POF cable 2b, the terminus 14b is slid onto the POF cable 2b and then the crimp ring 16b is slid onto the terminus 14b. Following various operations (described in detail below), the termini 14a and 14b are inserted into opposite ends of the splice alignment sleeve 12 and then securely attached to the splice alignment sleeve 12 by crimping. The final assembly is depicted in FIG. 1.

The final assembly depicted in FIG. 1 forms an apparatus 22 for guiding propagating light waves. The apparatus 22 includes a POF cable 2a spliced to a POF cable 2b. The splice optical couples the POF cables 2a and 2b to each other so that light waves can propagate from one cable to the other in either direction. The apparatus 22 further includes a POF splice assembly 10 configured to optical couple the end faces 5a and 5b (see FIG. 2) of the plastic optical fibers 4a and 4b to each other.

The POF splice assembly 10 depicted in FIG. 1 includes a terminus 14a having a first longitudinal section surrounding the end section of the plastic optical fiber 4a and a second longitudinal section surrounding a portion of the jacket 6a and a terminus 14b having a first longitudinal section surrounding the end section of the plastic optical fiber 4b and a second longitudinal section surrounding a portion of the jacket 6b. Both termini 14a and 14b are made of thermoplastic material.

Figure 3:
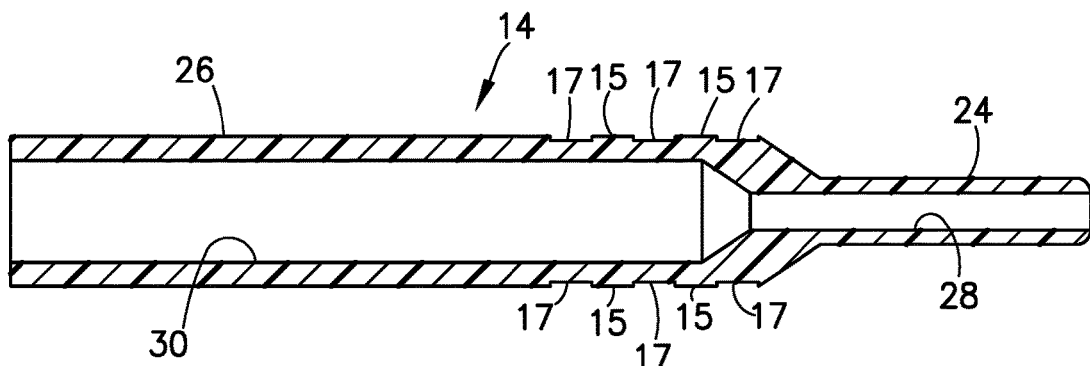
FIG. 3 is a diagram representing a sectional view of a terminus in accordance with one embodiment.

FIG. 3 is a diagram representing a sectional view of a terminus 14 in accordance with one embodiment. Each terminus 14a and 14b depicted in FIG. 2 may have a geometry which is the same as the geometry of terminus 14 depicted in FIG. 3. As seen in FIG. 3, each terminus 14 has a first longitudinal section 24 having a first outer diameter and a second longitudinal section 26 having a second outer diameter greater than the first outer diameter. In addition, the first longitudinal section 24 has a first circular cylindrical channel 28 with a first inner diameter and the second longitudinal section 26 has a second circular cylindrical channel 30 with a second inner diameter greater than the first inner diameter. The second longitudinal section 26 of each terminus 14 has first and second radially outwardly projecting annular projections 15 that form annular grooves 17 which facilitate the insertion of the thermoplastic terminus 14 into the thermoplastic splice alignment sleeve 12.

The first and second circular cylindrical channels 28 and 30 are axially aligned and configured to receive a stripped end of a POF cable. More specifically, the first inner diameter of the first circular cylindrical channel 28 inside the first longitudinal section 24 of the terminus 14 is sized to receive the unjacketed plastic optical fiber of a POF cable (e.g., the first inner diameter is slightly greater than the outer diameter of the plastic optical fiber); the second inner diameter of the second circular cylindrical channel 30 inside the second longitudinal section 26 of the terminus 14 is sized to receive the POF cable (e.g., the second inner diameter is slightly greater than the outer diameter of the POF cable).

Returning attention to FIG. 1, the POF splice assembly 10 further includes a splice alignment sleeve 12 made of thermoplastic material. For example, in accordance with one proposed implementation, the splice alignment sleeve 12 is made of a thermoplastic material such as polybutylene terephthalate. Preferably the thermoplastic material used to fabricate the splice alignment sleeve 12 has a coefficient of thermal expansion that matches the coefficients of thermal expansion of the materials used to fabricate the termini 14a and 14b. When the termini 14a and 14b are fully inserted into opposite ends of the splice alignment sleeve 12, the end faces 5a and 5b of the plastic optical fibers 4a and 4b confront each other, thereby optically coupling the plastic optical fibers 4a and 4b to each other. Preferably the first and second end faces 5a and 5b (see FIG. 2) do not contact each other.

Figure 4:
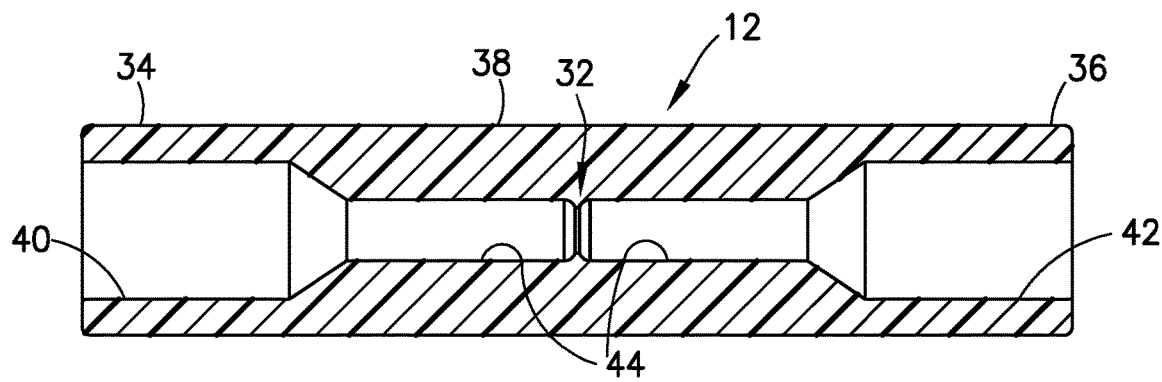
FIG. 4 is a diagram representing a sectional view of a splice alignment sleeve in accordance with one embodiment.

FIG. 4 is a diagram representing a sectional view of a splice alignment sleeve 12 in accordance with one embodiment. As seen in FIG. 4, the splice alignment sleeve 12 includes a first end section 34, a second end section 36 and a central section 38 connecting the end section 34 to the end section 36. The first and second end sections 34 and 36 and the central section 38 of the splice alignment sleeve 12 may all have the same outer diameter. The first end section 34 has a first circular cylindrical channel 40, while the second end section 36 has a second circular cylindrical channel 42. Both of the first and second circular cylindrical channels 40 and 42 have the same inner diameter (hereinafter "third inner diameter" to distinguish from the first and second inner diameters of the terminus 14). The central section 38 has a third circular cylindrical channel 44 disposed between the first and second circular cylindrical channel 40 and 42 and having a fourth inner diameter less than the third inner diameter. The first, second and third circular cylindrical channels 40, 42 and 44 are axially aligned accurately to each other to form a single through channel that extends from one end of the splice alignment sleeve 12 to the other end of the splice alignment sleeve 12.

To prevent end-face contact, the splice alignment sleeve 12 depicted in FIG. 4 has an aperture stop 32 disposed in the third circular cylindrical channel 44 that is configured to maintain a gap between the confronting end faces 5a and 5b of the plastic optical fibers 4a and 4b. For example, the aperture stop 32 may be in the form of a radially inwardly directed annular flange that has an opening with a diameter less than the outer diameter of the plastic optical fibers being optically coupled. This constriction blocks the end faces 5a and 5b (see FIG. 2) from contacting each other.

Figure 4A:
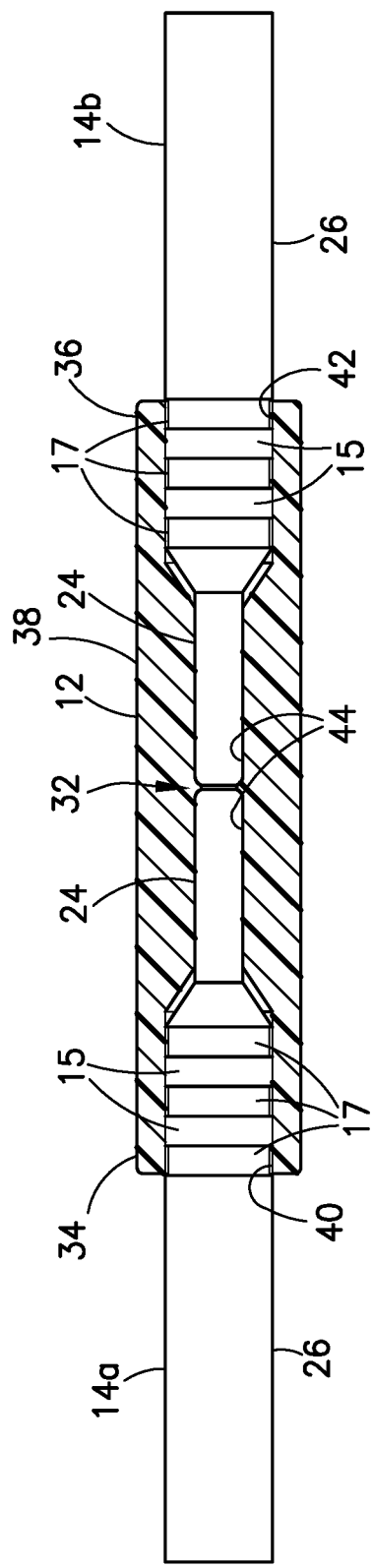
FIG. 4A is a diagram representing a cutaway view in which half of the splice alignment sleeve depicted in FIG. 4 has been cut away to reveal respective portions of a pair of termini inside the splice alignment sleeve.

FIG. 4A is a diagram representing a cutaway view in which half of the splice alignment sleeve 12 has been cut away to reveal respective portions of a pair of termini 14a and 14b inside the splice alignment sleeve 12. The splice alignment sleeve 12 surrounds the first longitudinal sections 24 of the termini 14a and 14b in their entireties and surrounds respective portions of the second longitudinal sections 26 of the termini 14a and 14b. As seen in FIG. 4A, the third circular cylindrical channel 44 inside the central section 38 of the splice alignment sleeve 12 is configured to receive the first longitudinal sections 24 of the termini 14a and 14b, while the first and second circular cylindrical channels 40 and 42 inside the end sections 34 and 36 are configured to receive the respective second longitudinal sections 26 of the termini 14a and 14b.

More specifically, the third inner diameter of the first and second circular cylindrical channels 40 and 42 inside the splice alignment sleeve 12 is sized to receive the second longitudinal sections 26 of the termini 14a and 14b (e.g., the third inner diameter is slightly greater than the outer diameter of the second longitudinal sections 26); the fourth inner diameter of the third circular cylindrical channel 44 inside the splice alignment sleeve 12 is sized to receive the first longitudinal sections 24 of the termini 14a and 14b (e.g., the fourth inner diameter is slightly greater than the outer diameter of the first longitudinal sections 24).

Figure 5:
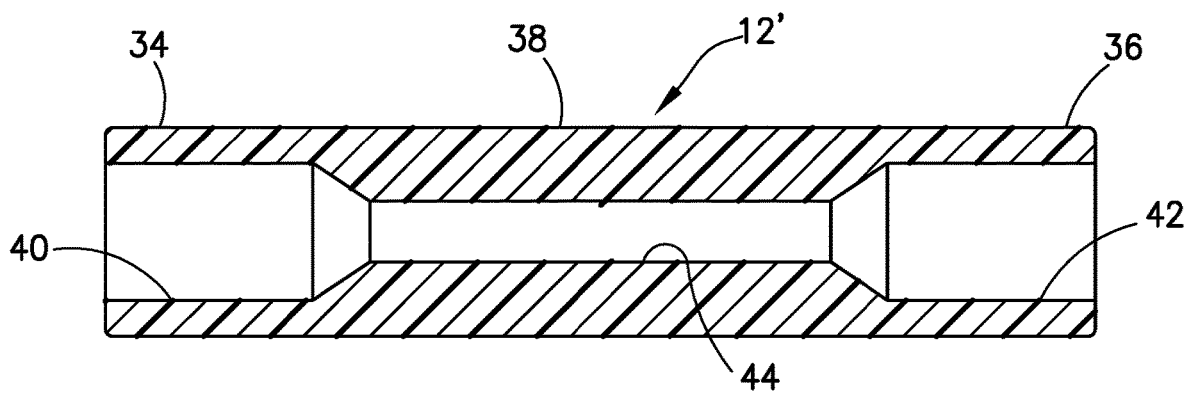
FIG. 5 is a diagram representing a sectional view of a splice alignment sleeve in accordance with another embodiment.
Figure 5A:
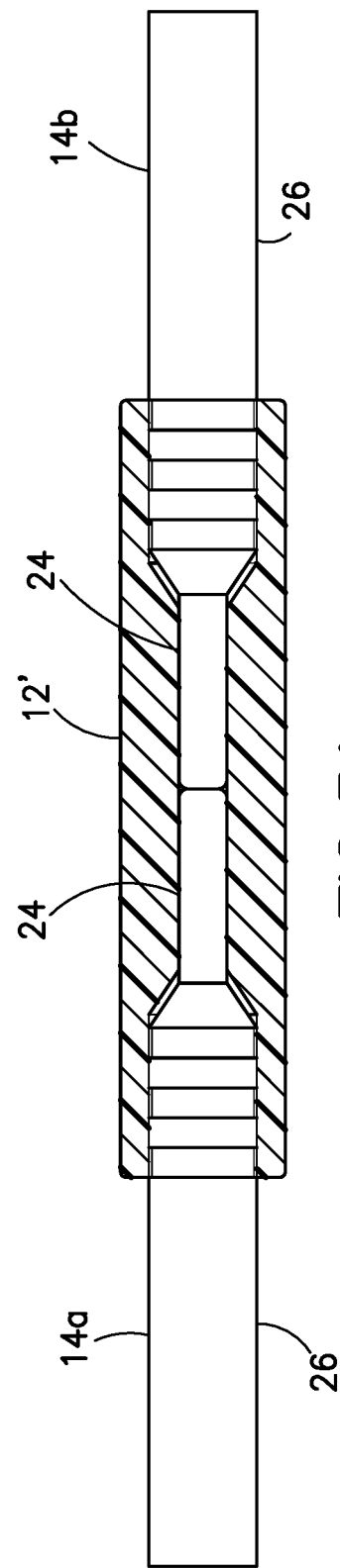
FIG. 5A is a diagram representing a cutaway view in which half of the splice alignment sleeve depicted in FIG. 5 has been cut away to reveal respective portions of a pair of termini inside the splice alignment sleeve.

FIG. 5 is a diagram representing a sectional view of a splice alignment sleeve 12' in accordance with another embodiment in which the aperture stop has been omitted. FIG. 5A is a diagram representing a cutaway view in which half of the splice alignment sleeve 12' depicted in FIG. 5 has been cut away to reveal respective portions of a pair of termini 14a and 14b inside the splice alignment sleeve 12. Even though splice alignment sleeve 12' does not have an aperture stop, other means may be used to prevent the end faces 5a and 5b (see FIG. 2) of the plastic optical fibers 4a and 4b from touching. For example, the termini 14a and 14b may be respectively affixed to the splice alignment sleeve 12' so that the end faces 5a and 5b (see FIG. 2) will always be separated by at least a minimum distance during normal operating conditions of the airplane despite some allowable axial compression of the splice alignment sleeve 12'.

Returning attention to FIG. 1, the POF splice assembly 10 further includes crimp rings 16a and 16b made of metallic material. The crimp ring 16a is crimped onto both the terminus 14a and one end of the splice alignment sleeve 12, thereby affixing the terminus 14a to the splice alignment sleeve 12. Similarly, the crimp ring 16b is crimped onto both the terminus 14b and the other end of the splice alignment sleeve 12, thereby affixing the terminus 14b to the splice alignment sleeve 12.

Figure 6:
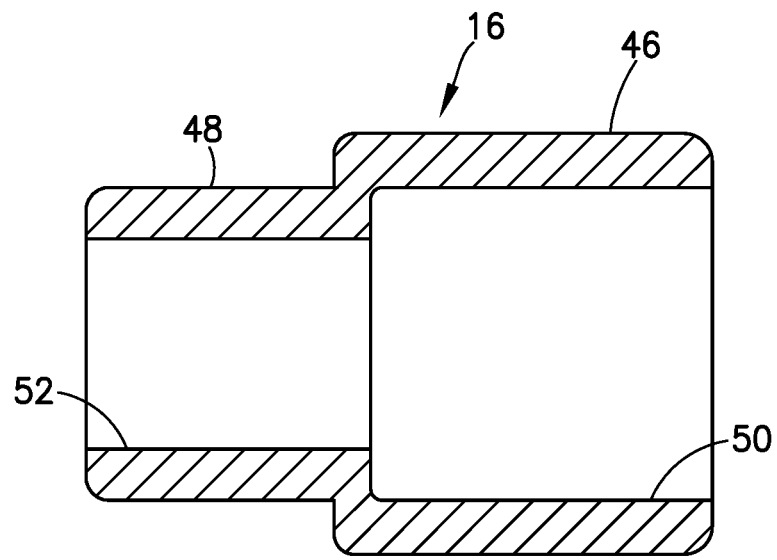
FIG. 6 is a diagram representing a sectional view of a crimp ring which is crimped onto both the splice alignment sleeve and one terminus in accordance with one embodiment.

FIG. 6 is a diagram representing a sectional view of a crimp ring 16 for affixing a terminus 14 to a splice alignment sleeve 12 in accordance with one embodiment. Each crimp ring 16a and 16b depicted in FIG. 1 may have a geometry which is the same as the geometry of crimp ring 16 depicted in FIG. 6. Each crimp ring 16 has a first longitudinal section 48 having a first circular cylindrical channel 52 with a fifth inner diameter (to distinguish from the first and second inner diameters of the terminus 14 and the third and fourth inner diameters of the splice alignment sleeve 12) and a second longitudinal section 46 having a second circular cylindrical channel 50 with a sixth inner diameter larger than the fifth inner diameter. The first and second circular cylindrical channels 52 and 50 inside each crimp ring 16 are axially aligned and configured to receive respective portions of a terminus 14 and a splice alignment sleeve 12.

More specifically, the fifth inner diameter of the first circular cylindrical channel 50 inside each crimp ring 16 is sized to receive an end section of the splice alignment sleeve 12 (e.g., the fifth inner diameter is slightly greater than the outer diameter of the splice alignment sleeve 12); the sixth inner diameter of the second circular cylindrical channel 52 inside each crimp ring 16 is sized to receive a portion of the second longitudinal section 26 of a terminus 14 (e.g., the sixth inner diameter is slightly greater than the outer diameter of the second longitudinal section 26 of a terminus 14).

Figure 6A:
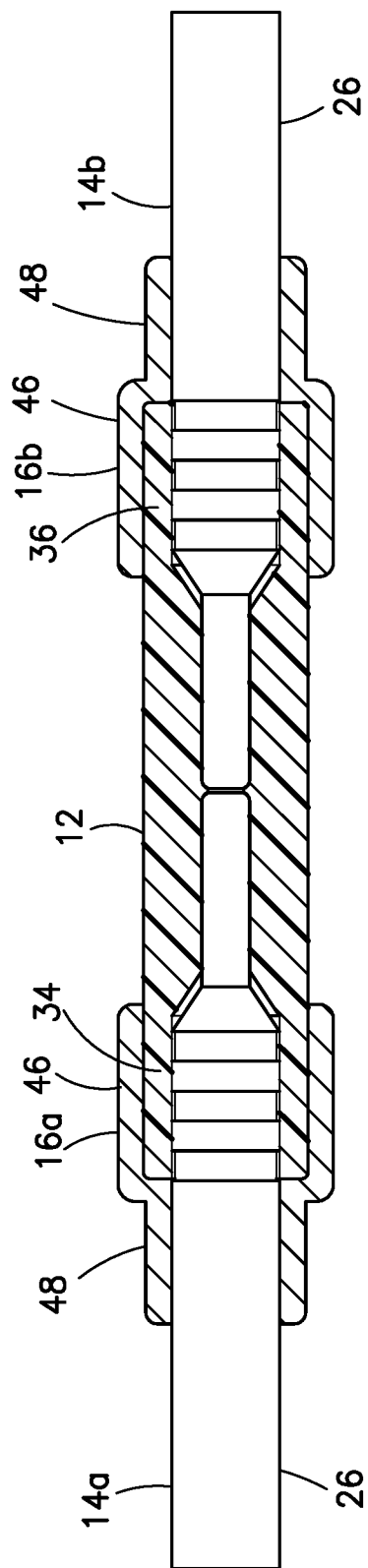
FIG. 6A is a diagram representing a cutaway view in which half of the splice alignment sleeve depicted in FIG. 5 and half of the crimp ring depicted in FIG. 6 have been cut away to reveal respective portions of a pair of termini inside the splice alignment sleeve.

FIG. 6A is a diagram representing a cutaway view in which half of the splice alignment sleeve 12 depicted in FIG. 5 and half of each of the crimp rings 16a and 16b have been cut away to reveal respective portions of a pair of termini 14a and 14b inside the splice alignment sleeve 12. As seen in FIG. 6A, the crimp ring 16a has a first longitudinal section 48 surrounding and crimped onto one portion of the second longitudinal section 26 of the terminus 14a and a second longitudinal section 46 surrounding and crimped onto one end section 34 of the splice alignment sleeve 12. Similarly, the crimp ring 16b has a first longitudinal section 48 surrounding and crimped onto one portion of the second longitudinal section 26 of the terminus 14b and a second longitudinal section 46 surrounding and crimped onto the other end section 36 of the splice alignment sleeve 12. In summary, the termini 14a and 14b are inserted into opposite ends of the splice alignment sleeve 12 and then affixed to the splice alignment sleeve 12 by double crimping the crimp rings 16a and 16b. As a result of the use of mechanical crimping instead of adhesive bonding, the interior space of the splice alignment sleeve is free of epoxy or other type of glue.

Returning attention to FIGS. 1 and 2, the apparatus 22 further includes a rubber boot 18a that slides onto the terminus 14a and abuts the crimp ring 16a, a rubber boot 18b that slides onto the terminus 14b and abuts the crimp ring 16b, a crimp ring 20a that slides onto the rubber boot 18a, and a crimp ring 20b that slides onto the rubber boot 18a. The crimp rings 20a and 20b are made of metallic material. It should be appreciated that the crimp rings 16a and 16b differ in geometry from the crimp rings 20a and 20b. In accordance with one proposed implementation, each of the crimp rings 20a and 20b is a circular cylindrical ring having a constant wall thickness. The circular cylindrical channel inside each crimp ring 20a and 20b has an inner diameter sized to receive a respective rubber boot 18a and 18b.

Figure 7:
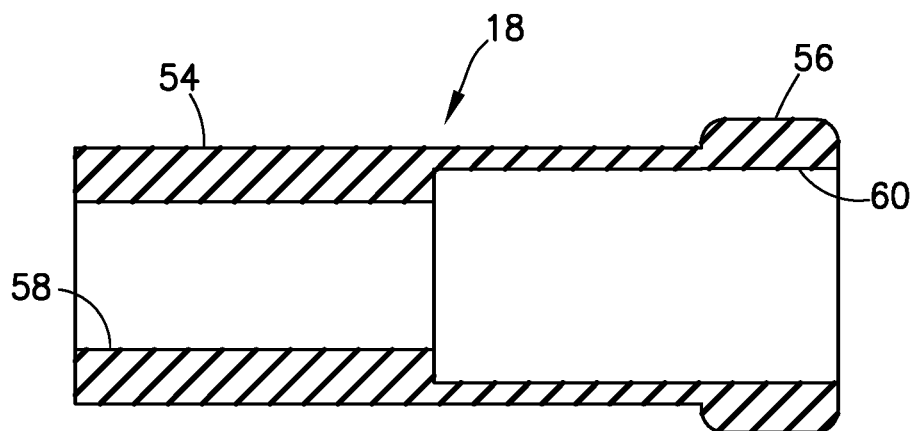
FIG. 7 is a diagram representing a sectional view of a rubber boot in accordance with one embodiment.

FIG. 7 is a diagram representing a sectional view of a rubber boot 18 in accordance with one embodiment. Each rubber boot 18a and 18b depicted in FIG. 1 may have a geometry which is the same as the geometry of rubber boot 18 depicted in FIG. 7. As seen in FIG. 7, each rubber boot 18 has a longitudinal section 54 and an annular flange 56 that projects radially outward from the longitudinal section 54. The longitudinal section 54 of each rubber boot 18 includes a first circular cylindrical channel 58 and a second circular cylindrical channel 60 which are axially aligned, but have different inner diameters. The first circular cylindrical channel 58 has an inner diameter which is slightly greater than the outer diameter of the jacketed portion of the POF cable (shown in FIG. 3); the second circular cylindrical channel 60 has an inner diameter which is slightly greater than the outer diameter of the second longitudinal section 26 of the terminus 14.

As seen in FIG. 1, when the POF splice assembly 10 is fully assembled, one end face of the flange 56 of rubber boot 18*a* abuts an end face of the crimp ring 16*a* while the other end face of the flange 56 of rubber boot 18*a* abuts an end face of the crimp ring 20*a*. Similarly, one end face of the flange 56 of rubber boot 18*b* abuts an end face of the crimp ring 16*b* while the other end face of the flange 56 of rubber boot 18*b* abuts an end face of the crimp ring 20*b*.

Figure 8:
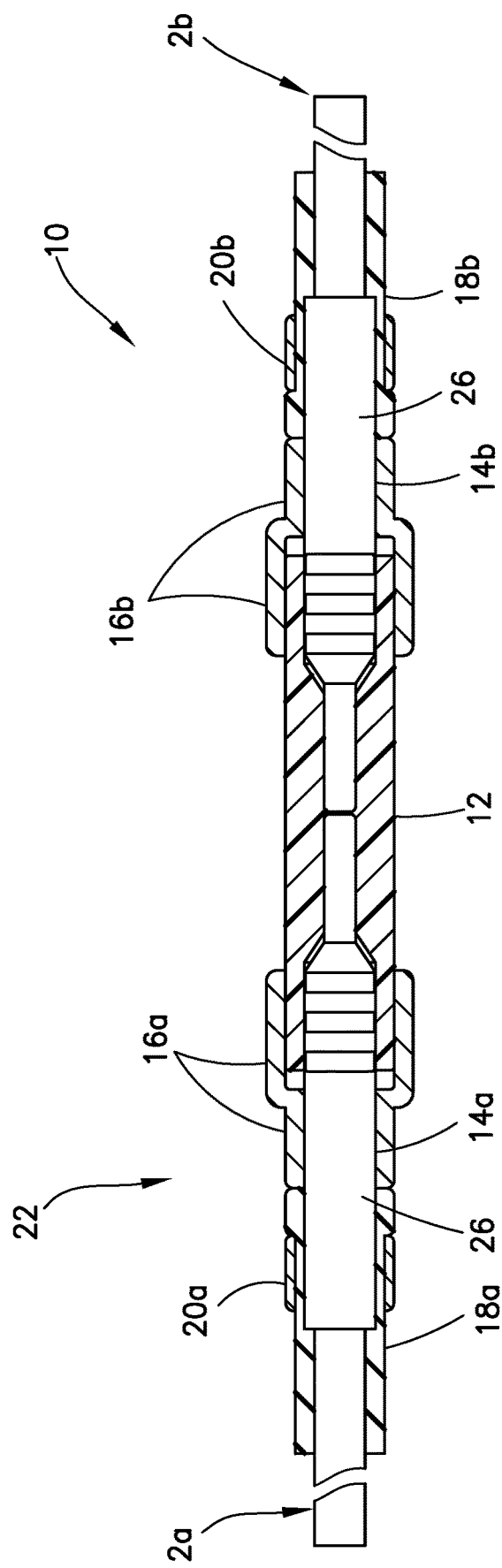
FIG. 8 is a diagram representing a sectional view of the POF splice assembly depicted in FIG. 1.

FIG. 8 is a diagram representing a sectional view of the POF splice assembly 10 depicted in FIG. 1. As seen in FIG. 8, the rubber boot 18*a* surrounds both a portion of the second longitudinal section 26 of the terminus 14*a* and a portion of the jacket of the POF cable 2*a*, while the rubber boot 18*b* surrounds both a portion of the second longitudinal section 26 of the terminus 14*b* and a portion of the jacket of the POF cable 2*b*. In addition, the crimp ring 20*a* surrounds and is crimped onto the longitudinal section of the rubber boot 18*a*, while the crimp ring 20*b* surrounds and is crimped onto the longitudinal section of the rubber boot 18*b*. Thus the terminus 14*a* is compressed onto the jacket of the POF cable 2*a* by the crimp rings 16*a* and 20*a* in respective crimped states, while the terminus 14*b* is compressed onto the jacket of the POF cable 2*b* by the crimp rings 16*b* and 20*b* in respective crimped states.

In accordance with the embodiment depicted in FIGS. 1 and 8, the crimp rings 20*a* and 20*b* are crimped onto the rubber boots 18*a* and 18*b* respectively, which in turn compresses rubber boots 18*a* and 18*b* on the termini 14*a* and 14*b* respectively, which in turn compresses the termini 14*a* and 14*b* on the jacketed portions of POF cables 2*a* and 2*b* respectively. Thus, each terminus is affixed to a respective POF cable by double crimping. The first of the double crimps on each terminus is provided by the aforementioned crimping of crimp rings 16*a* and 16*b* onto termini 14*a* and 14*b* respectively, which crimping compresses termini 14*a* and 14*b* on the jacketed portions of POF cables 2*a* and 2*b* respectively. The second of the double crimps on each terminus is provided by the crimping of crimp rings 20*a* and 20*b* onto the rubber boots 18*a* and 18*b* respectively, which in turn compresses the termini 14*a* and 14*b* on the jacketed portions of POF cables 2*a* and 2*b* respectively.

FIGS. 9A-9H are diagrams representing respective side views of the components of the POF splice assembly depicted in FIG. 2 at various stages in the splicing process in accordance with one embodiment. This splicing process is especially useful when a POF cable of an avionics system onboard an aircraft is damaged.

FIG. 9A shows a POF cable that has been cut to remove a damaged section, thereby forming two separate POF cables 2*a* and 2*b*. As shown in FIG. 9B, the jackets 6 in respective end sections of the POF cables 2*a* and 2*b* are stripped leaving respective lengths (e.g., approximately 1 inch) of exposed plastic optical fibers 4*a* and 4*b*.

In the next stage of the fabrication process, first the crimp ring 20*a* slid onto the POF cable 2*a*. Then the rubber boot 18*a* is slid onto the POF cable 2*a*. Next the crimp ring 16*a* is slid onto the POF cable 2*a*. In a similar order, the crimp ring 20*b*, rubber boot 18*b* and crimp ring 16*b* are slid onto the POF cable 2*b*. The result of these steps is seen in FIG. 9C.

Figure 9D:
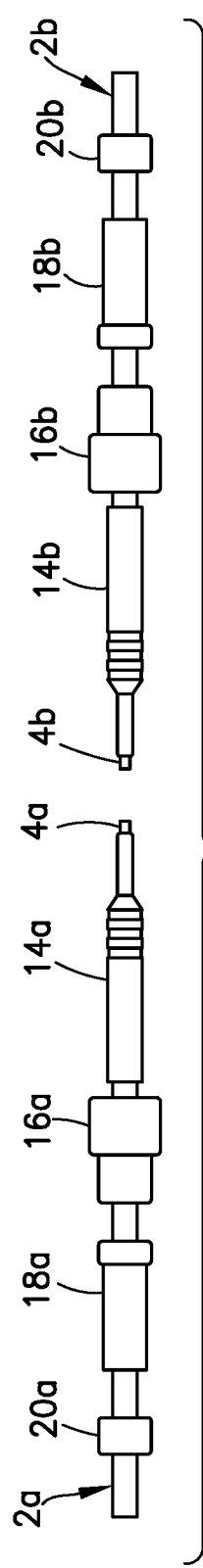

In the next stage of the fabrication process depicted in FIG. 9D, the terminus 14*a* is slid onto the POF cable 2*a*, leaving a small length (e.g., approximately 0.3 inch) of plastic optical fiber 4*a* protruding from the end face of the terminus 14*a*. In addition, the terminus 14*b* is slid onto the POF cable 2*b*, leaving a small length (e.g., approximately 0.3 inch) of plastic optical fiber 4*b* protruding from the end face of the terminus 14*b*.

Figure 9E:
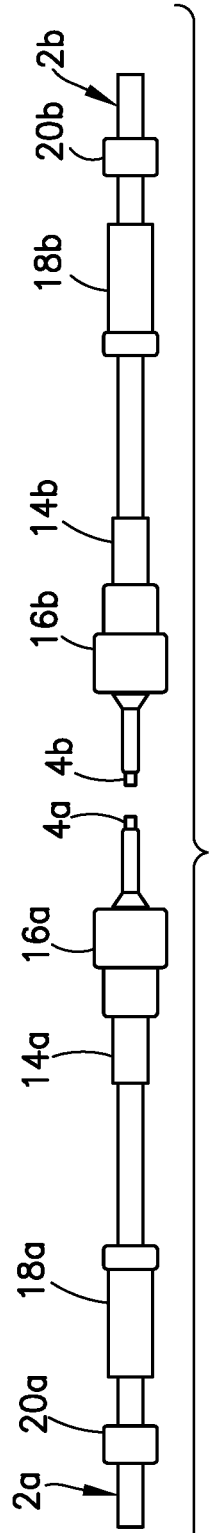

During the next stage depicted in FIG. 9E, the crimp ring 16*a* is slid onto the terminus 14*a* and the smaller-diameter longitudinal section 48 of crimp ring 16*a* is crimped onto the second longitudinal section 26 of the terminus 14*a* using a crimp tool. The crimped crimp ring 16*a* compresses the terminus 14*a* onto the POF cable 2*a*, causing the terminus 14*a* to clamp the POF cable 2*a*. In addition, the crimp ring 16*b* is slid onto the terminus 14*b* and the smaller-diameter longitudinal section 48 of crimp ring 16*b* is crimped onto the second longitudinal section 26 of the terminus 14*b* using a crimp tool. The crimped crimp ring 16*b* compresses the terminus 14*b* onto the POF cable 2*b*, causing the terminus 14*b* to clamp the POF cable 2*b*.

Figure 9F:
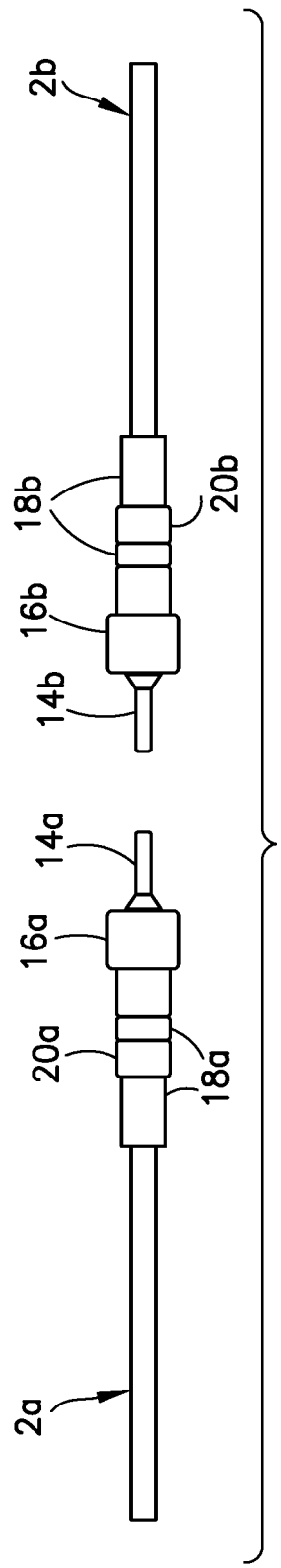

During the next stage, the rubber boot 16*a* is slid onto the second longitudinal section 26 of the terminus 14*a* until it abuts the crimp ring 16*a*. Then the crimp ring 20*a* is slid onto rubber boot 18*a* until crimp ring 20*a* abuts the flange 56 of rubber boot 18*a*. In addition, the rubber boot 16*b* is slid onto the second longitudinal section 26 of the terminus 14*b* until it abuts the crimp ring 16*b*. Then the crimp ring 20*b* is slid onto rubber boot 18*b* until crimp ring 20*b* abuts the flange 56 of rubber boot 18*b*. Then the crimp ring 20*a* is crimped onto rubber boot 18*a* and crimp ring 20*a* is crimped onto rubber boot 18*a*. The result of these operations is shown in FIG. 9F. The crimped crimp ring 20*a* compresses the rubber boot 18*a* and the terminus 14*a*, thus holding the rubber boot 18*a* in place and compressing the terminus 14*a* onto the POF cable 2*a*. Similarly, the crimped crimp ring 20*b* compresses the rubber boot 18*b* and the terminus 14*b*, thus holding the rubber boot 18*b* in place and compressing the terminus 14*b* onto the POF cable 2*b*. Each terminus 14*a* and 14*b* is crimped twice onto the respective POF cables 2*a* and 2*b*, which improves the maximum pull strength of the splice. The fiber end faces are then polished or diamond finished, inspected and cleaned before the termini 14*a* and 14*b* are inserted into the splice alignment sleeve 12.

In the next step of the fabrication process, the splice alignment sleeve 12 is placed between and aligned with the ends of the POF cables 2*a* and 2*b*, as depicted in FIG. 9G. To complete the splice, the larger-diameter longitudinal section 46 of crimp ring 16*a* is slid onto one end of the splice alignment sleeve 12 and held against the splice alignment sleeve 12 while longitudinal section 46 of crimp ring 16*a* is crimped onto the one end of the splice alignment sleeve 12. Similarly, the larger-diameter longitudinal section 46 of crimp ring 16*b* is slid onto the other end of the splice alignment sleeve 12 and held against the splice alignment sleeve 12 while longitudinal section 46 of crimp ring 16*b* is crimped onto the other end of the splice alignment sleeve 12. The splice assembly is completed after both crimp rings 16*a* and 16*b* have been crimped onto the splice alignment sleeve 12. This final assembly is depicted in FIG. 9H.

Figure 10:
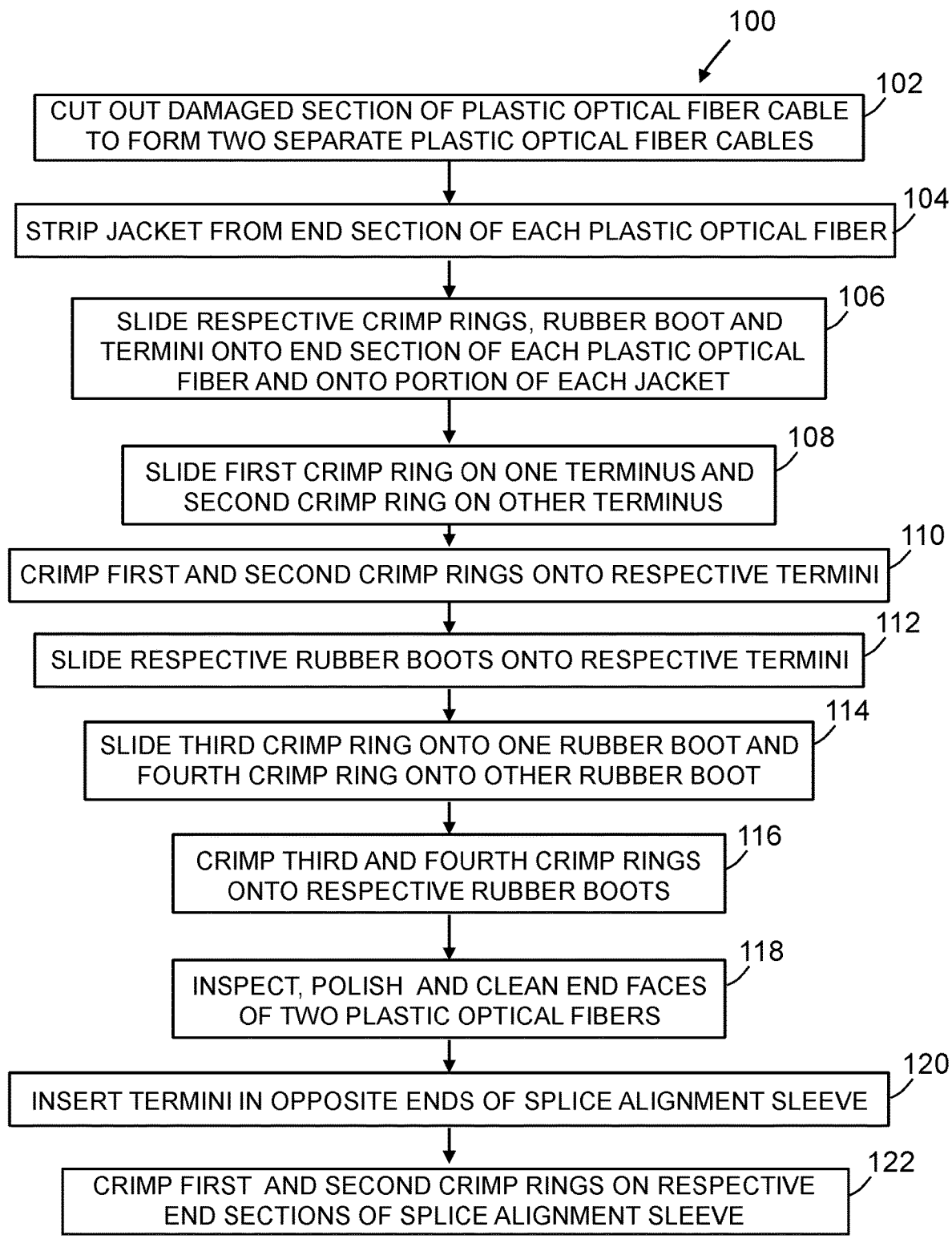
FIG. 10 is a flowchart identifying steps of a method for splicing two plastic optical fibers together in accordance with one embodiment.

Some of the steps in the fabrication process described with reference to FIGS. 9A-9H may be summarized in a flowchart. FIG. 10 is a flowchart identifying some steps of a method 100 for splicing two plastic optical fibers together in accordance with one embodiment. The method 100 includes at least the following steps. First, the damaged section of a POF cable is cut out to form two separate POF cables 2*a* and 2*b* (step 102). Then the jacket is stripped from a respective end section of each plastic optical fiber (step 104). Various components are slid onto the POF cables, including respective termini 14*a* and 14*b* which are slid onto respective end sections of each exposed plastic optical fiber and onto a portion of each adjoining jacket (step 106). Then a first crimp ring 16*a* is slid onto one terminus 14*a* and a second crimp ring 16*b* is slid onto on other terminus 14*b*

(step 108). Then the first and second crimp rings are crimped onto the respective termini (step 110), which are in turn compressed onto the POF cables. After the termini 14a and 14b have been respectively affixed to the POF cables 2a and 2b, respective rubber boots 18a and 18b are slid onto the respective termini (step 112). Then a third crimp ring 20a is slid onto one rubber boot 18a and a fourth crimp ring is slid onto the other rubber boot 18b (step 114). Then the third and fourth crimp rings are crimped onto the respective rubber boots (step 116), which in turn compresses the termini 14a and 14b on the POF cables. Thereafter the end faces of the separate plastic optical fibers 4a and 4b are polished, inspected and cleaned (step 118). The termini 14a and 14b are then inserted into opposite ends of the splice alignment sleeve (step 120). Finally, the first and second crimp rings 16a and 16b are crimped to respective end sections of the splice alignment sleeve 12 (step 122).

Step 102 involves the steps of severing first and second undamaged sections of the damaged POF cable from a damaged section of the damaged POF cable by cutting the POF cable at first and second positions on opposite sides of the damaged section of POF cable to form the two POF cables 2a and 2b.

In accordance with one proposed implementation, step 106 involves: sliding a first terminus 14a made of thermoplastic material onto the first POF cable 2a to a position whereat a first longitudinal section 24 of the first terminus 14a surrounds the end section of plastic optical fiber 4a and a second longitudinal section 26 of the first terminus 14a surrounds a portion of the first jacket 6a; and sliding a second terminus 14b made of thermoplastic material onto the second POF cable 2b to a position whereat a first longitudinal section 24 of the second terminus 14b surrounds the end section of plastic optical fiber 2b and a second longitudinal section 26 of the second terminus 14b surrounds a portion of the second jacket 6b.

In accordance with the proposed implementation partly described in the previous paragraph, step 108 involves: sliding a first crimp ring 16a made of metallic material onto the first terminus 14a to a position whereat a first longitudinal section 48 of the first crimp ring 16a surrounds a first portion of the second longitudinal section 26 of the first terminus 14a; and sliding a second crimp ring 16b made of metallic material onto the second terminus 14b to a position whereat a first longitudinal section 48 of the second crimp ring 16b surrounds a first portion of the second longitudinal section 26 of the second terminus 14b. In addition, step 110 involves: crimping the first longitudinal section 48 of the first crimp ring 16a onto the second longitudinal section 26 of the first terminus 14a; and crimping the first longitudinal section 48 of the second crimp ring 16b onto the second longitudinal section 26 of the second terminus 14b.

In accordance with the same proposed implementation, steps 112 and 114 involve the following steps: sliding a first rubber boot 18a onto the first terminus 14a to a position whereat a longitudinal section 54 of the first rubber boot 18a surrounds a second portion of the second longitudinal section 26 of the first terminus 14a; sliding a third crimp ring 20a made of metallic material onto the first rubber boot 18a to a position whereat the third crimp ring 20a surrounds a portion of the longitudinal section 54 of the first rubber boot 18a that surrounds the second portion of the second longitudinal section 26 of the first terminus 14a; sliding a second rubber boot 18b onto the second terminus 14b to a position whereat a longitudinal section 54 of the second rubber boot 18b surrounds a second portion of the second longitudinal section 26 of the second terminus 14b; and sliding a fourth crimp ring 20b made of metallic material onto the second rubber boot 18b to a position whereat the fourth crimp ring 20b surrounds a portion of the longitudinal section 54 of the second rubber boot 18b that surrounds the second portion of the second longitudinal section 26 of the second terminus 14b.

In accordance with the same proposed implementation, step 120 involves: inserting the first longitudinal section 24 of the first terminus 14a into an opening at one end of the splice alignment sleeve 12 until a second longitudinal section 46 of the first crimp ring 16a surrounds one end section 34 of the splice alignment sleeve 12; and inserting the first longitudinal section 24 of the second terminus 14b into an opening at another end of the splice alignment sleeve 12 until a second longitudinal section 46 of the second crimp ring 16b surrounds another end section 36 of the splice alignment sleeve 112.

During the movements of a vehicle such as an aircraft, vibrations occur in various components at various vibration amplitudes and phases. In cases where two components are in contact, vibrations can cause those components to rub against each other. In cases where the two components are made of plastic, the rubbing surfaces of the two components may become scratched or develop other defects. To avoid such damage, it is desirable to provide a fiber optic system in which an air gap is present between the confronting end faces 5a and 5b (see FIG. 2) of the plastic optical fibers 4a and 4b.

The splice alignment sleeve 12 is preferably fabricated by molding or three-dimensional printing using a flame retardant thermoplastic material having high durability, such as polybutylene terephthalate. The splice alignment sleeve 12 preferably has an aperture stop 32 in the center to keep the end faces 5a and 5b (see FIG. 2) of the plastic optical fibers 4a and 4b from coming in contact. Depending on requirements, the separation of the fibers can be determined by the design of the aperture stop. To reduce reflections, optical index matching gel can be applied to the fiber ends.

The technology proposed herein enables the inclusion of one or more of the following technical features: (a) a POF splice body formed by precision molding or three-dimensional printing; (b) an epoxy-free fabrication process; (c) a mechanical design using double crimp rings to hold the POF end faces at the maximum optical coupling location; (d) a miniature POF stop to eliminate the POF end-face damage due to a high-vibration environment; and (e) low cost because of the epoxy-free design and the passive POF optical alignment process. Since the splice body is manufactured by a precision molding or three-dimensional printing process, the parts of the splice assembly can be mass produced at very low cost.

While a method and an apparatus for splicing two plastic optical fibers have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for splicing first and second plastic optical fibers together, the method comprising:
   (a) stripping a portion of a first jacket of a first plastic optical fiber cable from an end section of a first plastic optical fiber of the first plastic optical fiber cable;
   (b) stripping a portion of a second jacket of a second plastic optical fiber cable from an end section of a second plastic optical fiber of the second plastic optical fiber cable;
   (c) sliding a first terminus made of thermoplastic material onto the first plastic optical fiber cable to a position whereat a first longitudinal section of the first terminus surrounds the end section of the first plastic optical fiber and a second longitudinal section of the first terminus surrounds a portion of the first jacket;
   (d) sliding a second terminus made of thermoplastic material onto the second plastic optical fiber cable to a position whereat a first longitudinal section of the second terminus surrounds the end section of the second plastic optical fiber and a second longitudinal section of the second terminus surrounds a portion of the second jacket;
   (e) sliding a first crimp ring made of metallic material onto the first terminus to a position whereat a first longitudinal section of the first crimp ring surrounds a first portion of the second longitudinal section of the first terminus;
   (f) sliding a second crimp ring made of metallic material onto the second terminus to a position whereat a first longitudinal section of the second crimp ring surrounds a first portion of the second longitudinal section of the second terminus;
   (g) crimping the first longitudinal section of the first crimp ring onto the second longitudinal section of the first terminus;
   (h) crimping the first longitudinal section of the second crimp ring onto the second longitudinal section of the second terminus;
   (i) after step (g), inserting the first longitudinal section of the first terminus into an opening at one end of a splice alignment sleeve until a second longitudinal section of the first crimp ring surrounds one end section of the splice alignment sleeve;
   (j) after step (h), inserting the first longitudinal section of the second terminus into an opening at another end of the splice alignment sleeve until a second longitudinal section of the second crimp ring surrounds another end section of the splice alignment sleeve;
   (k) after step (i), crimping the second longitudinal section of the first crimp ring onto the one end section of the splice alignment sleeve; and
   (l) after step (j), crimping the second longitudinal section of the second crimp ring onto the other end section of the splice alignment sleeve.

2. The method as recited in claim 1, wherein upon completion of steps (k) and (l), the first and second end faces do not contact each other inside the splice alignment sleeve.

3. The method as recited in claim 1, wherein upon completion of steps (k) and (l), an interior space of the splice alignment sleeve is free of epoxy.

4. The method as recited in claim 1, further comprising:
prior to step (i), polishing the first end face of the first plastic optical fiber; and
prior to step (j), polishing the second end face of the second plastic optical fiber.

5. The method as recited in claim 1, further comprising:
sliding a first rubber boot onto the first terminus to a position whereat a longitudinal section of the first rubber boot surrounds a second portion of the second longitudinal section of the first terminus;
sliding a third crimp ring made of metallic material onto the first rubber boot to a position whereat the third crimp ring surrounds a portion of the longitudinal section of the first rubber boot that surrounds the second portion of the second longitudinal section of the first terminus; and
crimping the third crimp ring onto the first rubber boot, wherein the first and second portions of the second longitudinal section of the first terminus are compressed onto the first jacket of the first plastic optical fiber cable by the first and third crimp rings in respective crimped states.

6. The method as recited in claim 5, further comprising:
sliding a second rubber boot onto the second terminus to a position whereat a longitudinal section of the second rubber boot surrounds a second portion of the second longitudinal section of the second terminus;
sliding a fourth crimp ring made of metallic material onto the second rubber boot to a position whereat the fourth crimp ring surrounds a portion of the longitudinal section of the second rubber boot that surrounds the second portion of the second longitudinal section of the second terminus; and
crimping the fourth crimp ring onto the second rubber boot,
wherein the first and second portions of the second longitudinal section of the second terminus are compressed onto the second jacket of the second plastic optical fiber cable by the second and fourth crimp rings in respective crimped states.

7. The method as recited in claim 1, further comprising the following step performed prior to steps (a) through (l):
severing first and second undamaged sections of a plastic optical fiber cable from a damaged section of the plastic optical fiber cable by cutting the plastic optical fiber cable at first and second positions on opposite sides of the damaged section of plastic optical fiber cable to form the first and second plastic optical fiber cables.

8. A method for repairing a damaged plastic optical fiber cable onboard an airplane, the method comprising:
   (a) severing first and second undamaged sections of the damaged plastic optical fiber cable from a damaged section of the damaged plastic optical fiber cable by cutting the plastic optical fiber cable at first and second positions on opposite sides of the damaged section of plastic optical fiber cable to form the first and second plastic optical fiber cables;
   (b) stripping a portion of a first jacket of the first plastic optical fiber cable from an end section of a first plastic optical fiber of the first plastic optical fiber cable;
   (c) stripping a portion of a second jacket of the second plastic optical fiber cable from an end section of a second plastic optical fiber of the second plastic optical fiber cable;
   (d) sliding a first terminus made of thermoplastic material onto the first plastic optical fiber cable to a position whereat a first longitudinal section of the first terminus surrounds the end section of the first plastic optical fiber and a second longitudinal section of the first terminus surrounds a portion of the first jacket;

(e) sliding a second terminus made of thermoplastic material onto the second plastic optical fiber cable to a position whereat a first longitudinal section of the second terminus surrounds the end section of the second plastic optical fiber and a second longitudinal section of the second terminus surrounds a portion of the second jacket;

(f) sliding a first crimp ring made of metallic material onto the first terminus to a position whereat a first longitudinal section of the first crimp ring surrounds a first portion of the second longitudinal section of the first terminus;

(g) sliding a second crimp ring made of metallic material onto the second terminus to a position whereat a first longitudinal section of the second crimp ring surrounds a first portion of the second longitudinal section of the second terminus;

(h) crimping the first longitudinal section of the first crimp ring onto the second longitudinal section of the first terminus;

(i) crimping the first longitudinal section of the second crimp ring onto the second longitudinal section of the second terminus;

(j) polishing an end face of the first plastic optical fiber;

(k) polishing an end face of the second plastic optical fiber;

(l) after step (j), inserting the first longitudinal section of the first terminus into an opening at one end of a splice alignment sleeve until a second longitudinal section of the first crimp ring surrounds one end section of the splice alignment sleeve;

(m) after step (k), inserting the first longitudinal section of the second terminus into an opening at another end of the splice alignment sleeve until a second longitudinal section of the second crimp ring surrounds another end section of the splice alignment sleeve;

(n) after step (l), crimping the second longitudinal section of the first crimp ring onto the one end section of the splice alignment sleeve; and (o) after step (m), crimping the second longitudinal section of the second crimp ring onto the other end section of the splice alignment sleeve.

9. The method as recited in claim 8, wherein upon completion of steps (n) and (o), the first and second end faces do not contact each other inside the splice alignment sleeve.

10. The method as recited in claim 8, wherein upon completion of steps (n) and (o), an interior space of the splice alignment sleeve is free of epoxy.

11. The method as recited in claim 8, further comprising:
sliding a first rubber boot onto the first terminus to a position whereat a longitudinal section of the first rubber boot surrounds a second portion of the second longitudinal section of the first terminus;
sliding a third crimp ring made of metallic material onto the first rubber boot to a position whereat the third crimp ring surrounds a portion of the longitudinal section of the first rubber boot that surrounds the second portion of the second longitudinal section of the first terminus; and
crimping the third crimp ring onto the first rubber boot, wherein the first and second portions of the second longitudinal section of the first terminus are compressed onto the first jacket of the first plastic optical fiber cable by the first and third crimp rings in respective crimped states.

12. The method as recited in claim 11, further comprising:
sliding a second rubber boot onto the second terminus to a position whereat a longitudinal section of the second rubber boot surrounds a second portion of the second longitudinal section of the second terminus;
sliding a fourth crimp ring made of metallic material onto the second rubber boot to a position whereat the fourth crimp ring surrounds a portion of the longitudinal section of the second rubber boot that surrounds the second portion of the second longitudinal section of the second terminus; and
crimping the fourth crimp ring onto the second rubber boot,
wherein the first and second portions of the second longitudinal section of the second terminus are compressed onto the second jacket of the second plastic optical fiber cable by the second and fourth crimp rings in respective crimped states.

13. A method for splicing first and second plastic optical fibers together, the method comprising:
(a) sliding a first terminus onto an end section of a first optical fiber cable;
(b) sliding a second terminus onto an end section of a second optical fiber cable;
(c) crimping a first portion of a first crimp ring onto the first terminus in an area where the first terminus surrounds a jacketed portion of the end section of the first optical fiber cable;
(d) crimping a first portion of a second crimp ring onto the second terminus in an area where the second terminus surrounds a jacketed portion of the end section of the second optical fiber cable;
(e) inserting one end of the first terminus into an opening at one end of a splice alignment sleeve;
(f) inserting one end of the second terminus into an opening at another end of the splice alignment sleeve;
(g) crimping a second portion of the first crimp ring onto one end section of the splice alignment sleeve; and
(h) crimping a second section of the second crimp ring onto another end section of the splice alignment sleeve.

14. The method as recited in claim 13, wherein upon completion of steps (g) and (h), first and second end faces of first and second optical fibers of the first and second optical fiber cables respectively do not contact each other inside the splice alignment sleeve.

15. The method as recited in claim 13, wherein upon completion of steps (g) and (h), an interior space of the splice alignment sleeve is free of epoxy.

16. The method as recited in claim 13, further comprising:
prior to steps (e) through (h), polishing the first end face of the first optical fiber; and
prior to steps (e) through (h), polishing the second end face of the second optical fiber.

17. The method as recited in claim 13, further comprising:
sliding a first rubber boot onto the first terminus;
sliding a third crimp ring made of metallic material onto the first rubber boot; and
crimping the third crimp ring onto the first rubber boot,
wherein the first terminus is respectively compressed onto the jacketed portion of the end section of the first optical fiber cable by the first and third crimp rings in respective crimped states.

18. The method as recited in claim 17, further comprising:
sliding a second rubber boot onto the second terminus;

sliding a fourth crimp ring made of metallic material onto the second rubber boot; and crimping the fourth crimp ring onto the second rubber boot, wherein the second terminus is respectively compressed onto the jacketed portion of the end section of the second optical fiber cable by the second and fourth crimp rings in respective crimped states.

19. The method as recited in claim 13, further comprising the following step performed prior to steps (a) through (h):

severing first and second undamaged sections of an optical fiber cable from a damaged section of the optical fiber cable by cutting the optical fiber cable at first and second positions on opposite sides of the damaged section of optical fiber cable to form the first and second optical fiber cables.

20. The method as recited in claim 13, wherein first and second optical fibers of the first and second optical fiber cables are made of plastic.

21. The method as recited in claim 13, wherein the first and second termini and the splice alignment sleeve are made of thermoplastic material.

\* \* \* \* \*